UNITED STATES PATENT OFFICE.

CHAS. E. PARIS AND CHAS. H. PARIS, OF PARIS, FRANCE.

IMPROVEMENT IN THE COMPOSITION FOR ENAMELING HOLLOW WARE.

Specification forming part of Letters Patent No. 7,145, dated March 5, 1849.

*To all whom it may concern:*

Be it known that we, CHARLES EMILE PARIS, of Paris, in the Republic of France, chemist, and CHARLES HENRI PARIS, of the same place, chemist, subjects of France, have invented or discovered new and useful Improvements in Preventing the Oxidation of Iron; and we, the said CHARLES EMILE PARIS and CHARLES HENRI PARIS, do hereby declare that the nature of our said invention and the manner in which the same is to be performed are fully described and ascertained in and by the following statement thereof—that is to say:

Our invention consists of a new and useful composition for coating articles made of either wrought or cast iron, so as to keep off the atmosphere and other fluids and matters which would cause the iron to oxidize.

In order that our invention may be most fully understood and readily carried into effect we will proceed to describe the means pursued by us:

In the first instance the articles to be coated with this new composition are, whether made of sheet-iron in the form of vessels, trays, pipes, or otherwise, to have their surfaces cleansed by dilute acid, as is well understood, and dried, and then a coating of gum dissolved in water is to be laid on the surfaces by means of a brush or otherwise, and then the vitreous composition is to be sifted all over the surfaces. The nature of this composition will be described. The article is then to be introduced into a heated oven or retort (212° to 300° of Fahrenheit) to be dried, and when dry the article is to be removed into another retort heated to a bright read heat till the glassy composition or vitreous matter melts on the surface, which will readily be seen by looking through a hole in the cover of the retort or oven. The article is then to be removed into a close chamber or covered over with a cover to exclude as much as may be the action of the atmosphere till the article is cooled down. If on examination the coating is imperfect another is to be added in like manner to the first.

The vitreous composition which I use is as follows: one hundred and thirty parts of flint glass reduced to powder; twenty and one-half parts of carbonate of soda; twelve parts of boracic acid. These matters, being intimately mixed, are to be placed in a glass-maker's crucible and melted. The same is then to be drawn off and cooled and then broken down into fine powder, which is to be sifted through a fine sieve—say seventy holes to the inch—and this powder is to be applied as before described. We would remark that although we believe the above to be the best vitreous composition for the purpose, we do not confine ourselves to the above-mentioned proportions therefor, as the same may be varied.

It is important in preparing the vitreous composition that it should be free from foreign matter. For this purpose we employ hardened-steel stampers for crushing the same into powder, and before employing the crucible we cause it to be coated with glass by applying gum-water to the inner surface of the crucible, and then dusting over the powder of glass, and after the same has been well dried we cause the same to be heated gradually up to the heat which fuses the glass, by which the surface of the crucible will be coated with glass, and will thus when used prevent impurities from the crucible getting mixed up with the glass or vitreous mixture melted therein.

If it be desired that the surfaces of the iron should have a colored vitreous composition applied thereto, then we cause it first to be coated with the composition above explained and afterward we apply a further coating of colored-glass composition to the whole or parts of the surface, as may be desired.

Having thus described the nature of our said invention and the manner of performing the same, we would have it understood that we do not confine ourselves to the details herein given; but

What we claim is—

The new and useful glazing composition for coating articles of iron to prevent oxidation, substantially as specified.

CHARLES EMILE PARIS.
   CHARLES HENRI PARIS.

Witnesses to the signature of Charles Emile Paris:
 PHILIPP IMPONOLA,
 *Negot, Rue de Vearmes, No. 2, à Paris,*
 JOHN BARTLY,
 *Secretary of the American Consulate, Paris.*

Witnesses to the signature of Charles Henri Paris:
 WILLIAM COOPER,
 JOSEPH MARGAETTE,
 *Both of Bishopsgate Churchyard, London.*